(12) United States Patent
Swart

(10) Patent No.: US 7,053,603 B2
(45) Date of Patent: May 30, 2006

(54) CIRCUIT ARRANGEMENT WITH A LINEAR VARIABLE DIFFERENTIAL TRANSFORMER (LVDT) AS A DISPLACEMENT SENSOR OR FORCE SENSOR

(75) Inventor: Marten Swart, Obertraubling (DE)

(73) Assignee: Siemens Aktiengesellschaft, Munich (DE)

( * ) Notice: Subject to any disclaimer, the term of this patent is extended or adjusted under 35 U.S.C. 154(b) by 134 days.

(21) Appl. No.: 10/807,406

(22) Filed: Mar. 24, 2004

(65) Prior Publication Data

US 2004/0227507 A1 Nov. 18, 2004

(30) Foreign Application Priority Data

Mar. 24, 2003 (DE) ................................. 103 13 021
Mar. 24, 2003 (DE) ................................. 103 13 022

(51) Int. Cl.
*G01B 7/14* (2006.01)
(52) U.S. Cl. .......................... 324/207.18; 324/207.24; 324/202; 324/207.12; 340/870.36; 318/657
(58) Field of Classification Search ........... 324/207.18, 324/207.17, 340, 202, 225, 207.12, 207.24; 318/656–661; 340/870.35, 870.36; 336/130
See application file for complete search history.

(56) References Cited

U.S. PATENT DOCUMENTS

| | | | | |
|---|---|---|---|---|
| 3,694,785 A | * | 9/1972 | Chass | 336/136 |
| 5,089,930 A | * | 2/1992 | Chass | 361/140 |
| 5,180,979 A | * | 1/1993 | Frazzini et al. | 324/207.18 |
| 5,606,515 A | * | 2/1997 | Mockapetris et al. | 702/106 |
| 5,617,023 A | * | 4/1997 | Skalski | 324/207.17 |
| 5,777,468 A | * | 7/1998 | Maher | 324/207.18 |
| 6,642,711 B1 | * | 11/2003 | Kawate et al. | 324/207.17 |
| 2003/0188585 A1 | * | 10/2003 | Esser et al. | 73/826 |

* cited by examiner

*Primary Examiner*—Jay M. Patidar
(74) *Attorney, Agent, or Firm*—Morrison & Foerster LLP

(57) ABSTRACT

In a circuit arrangement having a linear variable differential transformer as a displacement sensor or force sensor, having a selection circuit which is connected to the primary coil of the transformer and which provides an output current for triggering the primary coil, and having an analysis circuit which is connected to the secondary coils of the transformer and which provides a message signal, a control circuit used for triggering the selection circuit and the analysis circuit and for processing the measurement signal provided by the analysis circuit is connected to the primary coil in order to calculate the temperature of the circuit arrangement, and is configured such that it determines the temperature-dependent ohmic resistance of the primary coil and calculates from it the temperature and corrects accordingly the measurement signal provided by the analysis circuit.

11 Claims, 8 Drawing Sheets

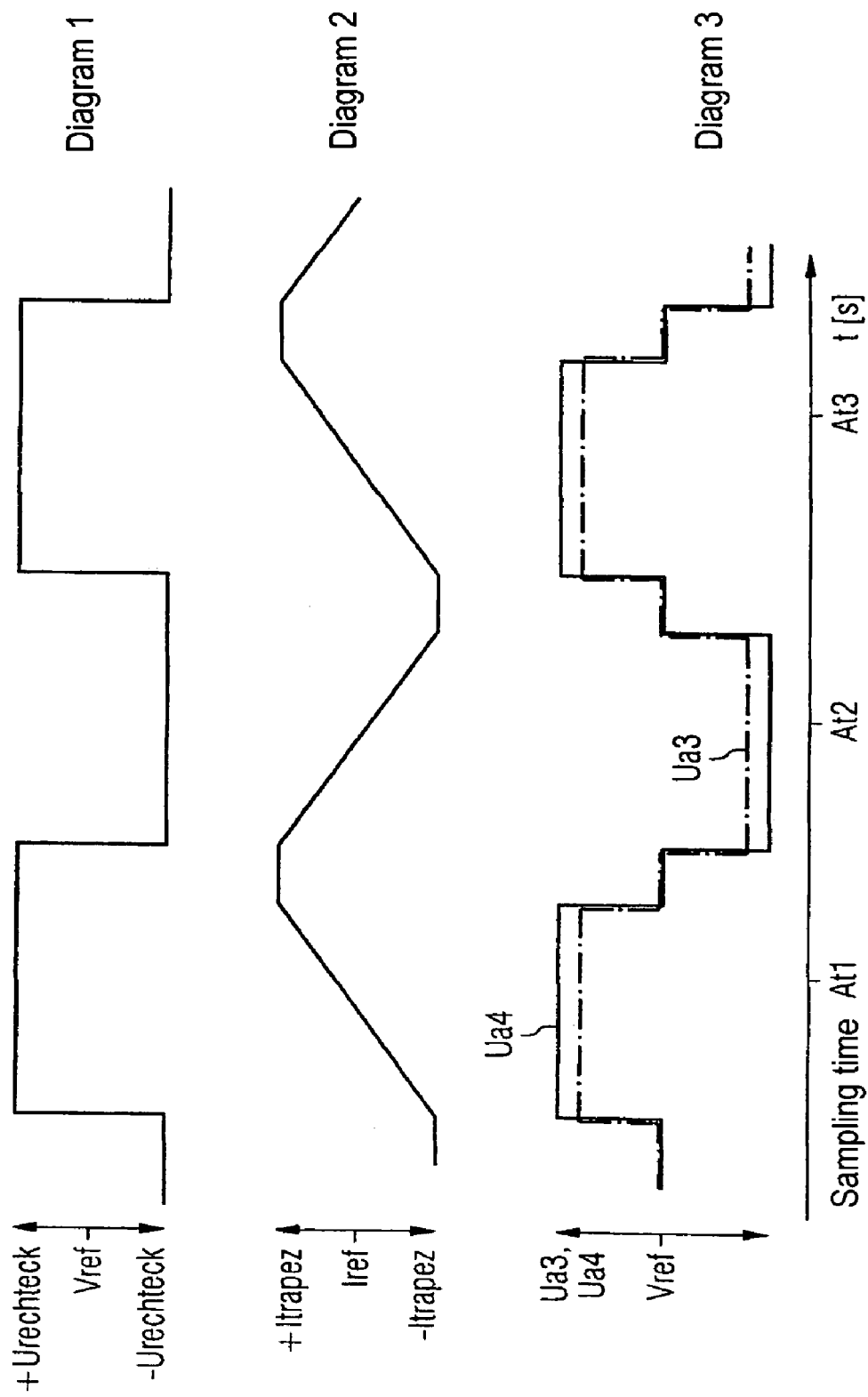

CIRCUIT ARRANGEMENT WITH A LINEAR VARIABLE DIFFERENTIAL TRANSFORMER (LVDT) AS A DISPLACEMENT SENSOR OR FORCE SENSOR

CLAIM FOR PRIORITY

This application claims the benefit of priority to German Application No. 10313022.5, filed in the German language on Mar. 24, 2003 and German Application No. 10313021.7, filed in the German language on Mar. 24, 2003, the contents of which are hereby incorporated by reference.

TECHNICAL FIELD OF THE INVENTION

The invention relates to a circuit arrangement having a linear variable differential transformer as a displacement or force sensor.

BACKGROUND OF THE INVENTION

A generic circuit arrangement is known from U.S. Pat. No. 5,777,468 A. When such a circuit arrangement is used to determine the weight of a person sitting in a driver's seat—i.e. the force being exerted upon the driver's seat—the amount of displacement of the driver's seat caused by the exertion of force or by the weight of the person is measured and converted into an electrical signal. In such an application it is desirable not only for the person's weight to have a sufficiently high resolution, but also for the seat to be capable of moving by only a few millimeters, to prevent any uncomfortable rocking motion being caused by the required sprung suspension. This means it is usually necessary to use a very firm spring, for example in the form of a flat spring.

A further circuit arrangement with a linear variable differential transformer is known from U.S. Pat. No. 5,180,979, in which the primary coil is triggered with a triangular voltage. The resulting total triangular voltage on the two secondary coils is compared to a reference voltage and the amount by which the total voltage duration exceeds the reference voltage duration is indicative of the magnitude of the displacement of the transformer core. The required minor displacement combined with a high resolution therefore leads to a requirement for high sensitivity in the measurement device.

The measurement signal of the circuit arrangement, which is proportional to the force exerted, is dependent upon the temperature to which the circuit arrangement is exposed. It is therefore necessary to determine the dependency of the measurement signal on the temperature and to perform a corresponding correction for any prevailing temperature. This means, however, that it is necessary to know the current temperature, and therefore a thermal detector may be used to measure the temperature. The use of additional thermal detectors, however, requires additional expenditure on materials and is therefore less cost-effective.

A method for determining the temperature of an inductive displacement sensor by calculating the temperature-dependent copper resistance of the coil winding is known from DE 43 13 273 A1. In the known method, a constant voltage is applied and maintained on the serial connection consisting of the coil inductance and a resistor until the inductance reaches saturation, so that the current through the coil is still only determined by the copper resistance. The current coil resistance and thus the current temperature are determined from the resulting voltage on the coil. However, in a circuit arrangement with a transformer, whose primary coil has a triangular voltage applied to it and in which a triangular voltage should also be present on the secondary side, this measurement principle cannot be used since the coil cannot reach saturation.

SUMMARY OF THE INVENTION

The invention relates to a circuit arrangement having a linear variable differential transformer (LVDT) as a displacement or force sensor, having a selection circuit which is connected to the primary coil of the transformer (LVDT) and which provides an output current for triggering the primary coil, and having an analysis circuit which is connected to the secondary coils of the transformer (LVDT) and which provides a message signal.

The invention develops the generic circuit arrangement such that the temperature may be measured as accurately as possible with minimal cost.

In one embodiment of the invention, the resistance value of the primary coil is temperature-dependent and therefore the current temperature of the circuit arrangement can be determined by calculating this resistance value using simple and also highly accurate methods. On the basis of the known temperature-dependence of the measurement signal of the circuit arrangement, which may be obtained by trials, the measurement signal can then be corrected by the control circuit so that the effects of temperature are eliminated. The resistance value of the primary coil is calculated by measuring the voltage on the primary coil and by measuring the current through the primary coil, or a voltage proportional to this current.

According to another embodiment of the invention, the current through the primary coil has a trapezoidal characteristic with correspondingly high rising edge and falling edge values. The control circuit is thus configured such that sampling values of a rectangular voltage picked up on the primary coil and also of a voltage proportional to the current through the primary coil, are taken at times when the trapezoidal current has a constant characteristic. This causes the resistance value of the primary coil to be determined if just one direct current flows through the primary coil, and therefore its inductance does not affect the measurement result.

In an advantageous embodiment according to the invention, the control circuit has an adding circuit at whose inputs are applied a voltage proportional to the resistance value of the primary coil and a reference voltage. The reference voltage has a polarity that is opposite to the voltage that is proportional to the primary coil resistance, so that the difference between the two voltages is actually formed. Thus, by selecting suitable values on the protective circuit elements of the adding circuit, in particular the values of series and feedback resistors, a situation may be achieved whereby their output voltage is zero volts at a specific reference temperature (ideally the ambient temperature), and thus deviations above or below the ambient temperature are characterized by a corresponding output voltage sign.

In a further advantageous embodiment according to the invention, the reference voltage is a voltage proportional to the current through the primary coil, since this causes variations in the primary coil current which show up as variations in the measured resistance value and which go directly into the reference voltage, and are thus automatically taken into account in the output value of the adding circuit, and this consideration does not have to be achieved by the costly effect of a separate reference voltage.

In a further embodiment, the sampling values are determined in both the first and second halves of the period and the difference values formed from the sampling values from the first half of the period and from the sampling values from the second half of the period are used as measurement values. This doubles the sensitivity of the measurement. Furthermore, common-mode interferences are eliminated by the difference formation.

In practice, deviations occur from predefined setpoint values in the resistance values of the adding circuit, the primary coil resistance value, and the current through the primary coil or the voltage that this generates. Consequently, the output voltage of the adding circuit deviates from 0 volts at the predefined reference temperature, and the temperature measurement sensitivity of the circuit arrangement deviates from a predefined setpoint value. In an advantageous embodiment of the invention, the values actually measured are compared to the setpoint values and the deviations are used as correction values for calibration of the measurement device.

Triggering the primary coil of the transformer using a current with a trapezoidal characteristic enables bipolar rectangular voltages to be picked up on the secondary coils. The amplitude of these rectangular voltages is proportional to the displacement of the transformer core during the phase position of these rectangular voltages and shows the direction in which the displacement occurs. The rectangular voltages are bipolar relative to a reference voltage, which ideally corresponds to half of the supply voltage. If the core is located in a position midway between the two secondary coils, which—in an application to determine seated weight in a vehicle—corresponds to a situation in which the seat is not occupied, the amplitudes and phases of the two secondary coil output voltages are of equal size and their difference is zero accordingly. If the core is displaced, one secondary coil output voltage is higher and the other correspondingly lower. Therefore, in order to determine any deviation in the core from this midway position, the difference between the two is formed since this enables the sensitivity to be increased. Moreover, additional interference signals which are superimposed on the two output voltages are eliminated.

Since one output voltage is higher and the other output voltage is lower, and the amounts of the variations in linear operation are equally large, the sum of the two output voltages is constant in normal operation. Because of environmental influences, however, the output voltages often deviate from their nominal values. In an advantageous development of the invention, the sum of the secondary coil output voltages is compared to a setpoint value and the increase in the rising edge and falling edge values of the trapezoidal output current of the selection circuit of the linear variable differential transformer varies in inverse proportion to the deviation of this sum from the setpoint value. This control results in the sensitivity of the circuit arrangement being maintained constantly at the predefined setpoint value independently of external influences. A suitably configured control circuit, in particular a microprocessor, is used for the control.

In still a further embodiment of the invention, the analysis circuit has two amplifier circuits which are each connected to one of the two secondary coils which amplify the output signals of the coils, the outputs of the amplifier circuits being connected to the control circuit. This enables the output voltages of the secondary coils to be isolated from the analysis circuit.

In order to generate the trapezoidal trigger current for the primary coil of the transformer, in an advantageous embodiment the selection circuit has a rectangular voltage generation circuit and an integrating circuit connected downstream of said rectangular voltage generation circuit.

In another advantageous embodiment, the rectangular voltage generation circuit is formed with a first resistor, whose first terminal is connected to a third voltage source and whose second terminal is connected to the output of the rectangular voltage generation circuit, and with a second resistor, whose first terminal is connected to a fourth voltage source and whose second terminal is connected to the output of the rectangular voltage generation circuit via a switch controllable from a control circuit, the voltages of the third and the fourth voltage source following the relationship $$U3-Uref=Uref-U4$$

and Uref being a reference voltage, which—for example—may be half the value of the supply voltage. If the third and the fourth voltage source are configured as controllable, variable voltage sources, the amplitude of the rectangular voltage—and thus the edge steepness of the triangular output voltage of the integration circuit—can easily be adjusted by triggering the two voltage sources through the control circuit.

Since, in any variation in the edge steepness during a constant period of the integration circuit output signal, its amplitude would vary and could possibly assume unacceptably high values, in an advantageous development of the circuit arrangement the integration circuit is formed with an operational amplifier whose output is coupled back to the inverting input via a capacitor, whereby a bi-directional Zener diode is switched in parallel to the capacitor. In this way the output voltage of the integration circuit is limited to a positive and also negative maximum value determined by the Zener diode and the trapezoidal signal is thus formed.

In yet another embodiment according to the invention, the analysis circuit is configured such that sampling values of the rectangular voltage are taken in both the first and second half of the period and the difference values formed from the relevant sampling values in the first half of the period and from the relevant sampling values in the second half of the period are output as a measurement signal.

The formation of the difference between a positive and a negative sampling value produces a measurement value with double amplitude, resulting in a two-fold increase in the sensitivity of the measurement device. In addition, any direct voltage offsets present are eliminated by the difference formation.

BRIEF DESCRIPTION OF THE INVENTION

The invention is explained in greater detail with reference to exemplary embodiments in the figures, in which:

FIG. 10 shows the characteristics of signals of the extended circuit arrangement.

DETAILED DESCRIPTION OF THE INVENTION

Figure 1:
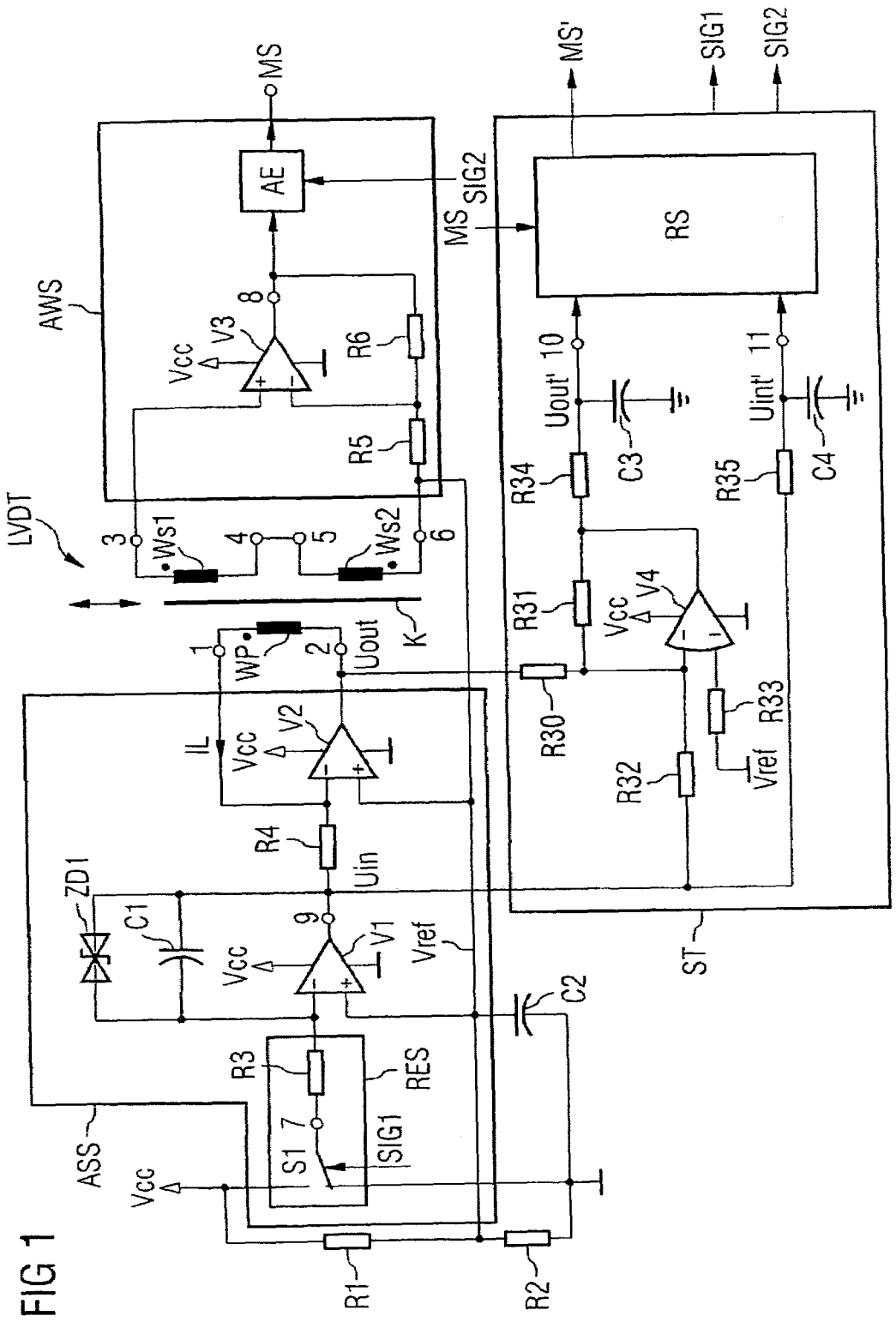
FIG. 1 shows a circuit arrangement according to the invention.

FIG. 1 shows a linear variable differential transformer (LVDT), which is formed with a primary coil Wp and two secondary coils Ws1, Ws2. The primary coil Wp is magnetically coupled to the secondary coils Ws1, Ws2 via a core K. The secondary coils Ws1, Ws2 are connected in series such that the difference between the voltages at the individual secondary coils Ws1 and Ws2 can be picked up at the free ports 3 and 6. The core K is moveable and, for the preferred application field, may be coupled with a driver's seat using a method that is not illustrated, so that—in the event of a compressive or tensile load on the seat—the core may move accordingly between the coils of the linear variable differential transformer (LVDT). If the core K is located in a position midway between the two secondary coils Ws1, Ws2, the voltage that may be picked up at ports 3 and 6 is equal to 0.

Figure 2:
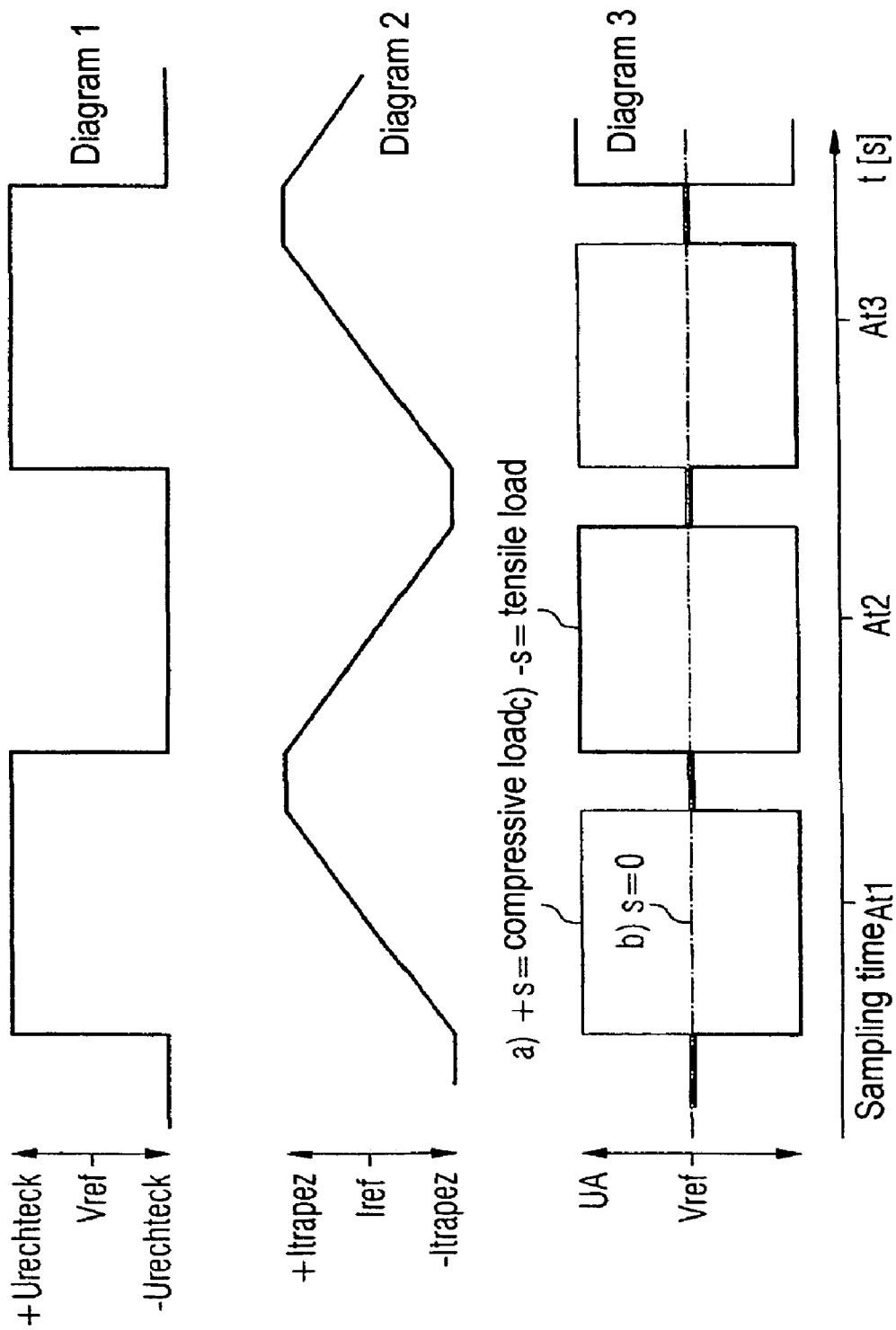
FIG. 2 shows the characteristics of characteristic signals of the circuit arrangement according to the invention.

The primary coil Wp is triggered at its ports 1, 2 by a selection circuit ASS with a current IL with trapezoidal characteristic. The current characteristic is shown by the diagram in FIG. 2. In this context the selection circuit ASS has a voltage current converter formed with an operational amplifier V2, whereby the output of said operational amplifier V2 is coupled back to its inverting input via the primary coil. Furthermore, the inverting input of the operational amplifier V2 is connected via a resistor R4 to the output of an integration circuit triggered by a rectangular voltage, which is formed, according to a known method, using a countercoupled operational amplifier V1 via a capacitor C1 from its output to its inverting input. The non-inverting inputs of the two operational amplifiers V1 and V2 are connected to a reference potential Vref. In the exemplary embodiment illustrated, the reference potential Vref is provided by means of a voltage divider from two resistors R1 and R2 connected in series at their mid-tap, the voltage divider being disposed between the supply voltage Vcc and a ground potential. A buffer capacitor C2 is connected in parallel to the second resistor R2 of the voltage divider. The resistors R1 and R2 of the voltage divider are ideally of equal size, so that the reference voltage Vref is equal to half the supply voltage Vcc (Vref=Vcc/2).

The rectangular voltage is formed by means of a rectangular generation circuit RES, which is formed in the exemplary embodiment according to FIG. 1 using a transfer switch S1 and a resistor R3 connected to the output port 7 of the transfer switch S1. The other port of the resistor R3 forms the output port of the rectangular generation circuit RES and is connected to the inverting input of the operational amplifier V1 of the integration circuit. The transfer switch S1 switches the output between the supply voltage Vcc and the frame ground terminal. It is triggered by a control signal SIG1 from a control circuit ST, which—for example—may be formed with a microprocessor. At the output 7 of the transfer switch S1 is a voltage with a rectangular characteristic, which switches with regard to the reference voltage Uref=Vcc/2 between two voltages +Urechteck and −Urechteck with the timing of the control signal SIG1. In the exemplary embodiment shown in FIG. 1, +Urechteck is equal to Vcc and −Urechteck is equal to 0 volts (ground).

Figure 5:
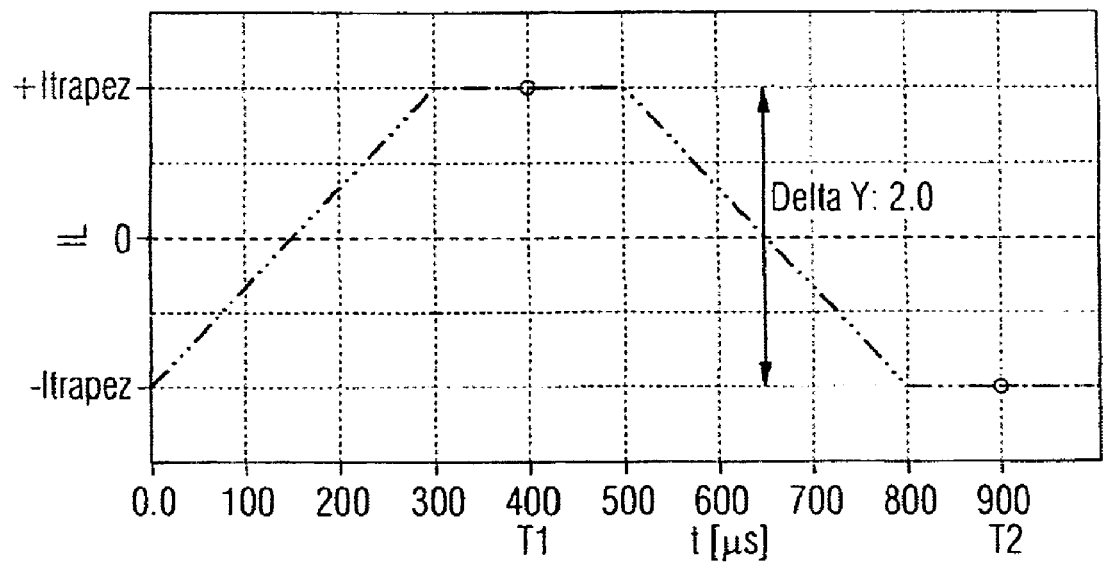
FIG. 5 shows the characteristic of the current through the primary coil.

The capacitor C1 of the integration switch is switched in parallel to a bipolar Zener diode ZD1, to limit the output voltage of the integration circuit to a maximum value. The output signal of the integration switch thus in principle has a trapezoidal characteristic, which flows with regard to the reference voltage Uref between the values +Utrapez and −Utrapez via linear rising and falling edges. FIG. 5 shows this trapezoidal characteristic, which flows between +Itrapez and −Itrapez via linear rising and falling edges according to its input voltage, for the output current IL of the voltage current converter V2.

The ports 3 and 6 of the secondary coils Ws1 and Ws2 are connected to an analysis curcuit AWS, which is formed with an inverting amplifier V3, R5, R6 and an analysis unit AE. The port 3 of the first secondary coil Ws1 is connected to the non-inverting input of an operational amplifier V3, and the port 6 of the second secondary coil Ws2 is connected via a resistor R5 to the inverting input of the operational amplifier V3. The output port 8 of the operational amplifier is coupled back to the inverting input via a resistor R6. The port 6 of the second secondary coil is also connected to the reference potential Vref.

The output port 8 of the operational amplifier V3 is connected to the input of an analysis unit AE, at whose output the measurement signal MS is provided. The analysis unit AE is configured such that, timed by a second control signal SIG2 generated by the control unit ST, it samples the output voltage of the operational amplifier V3 both in the first half of the period at a first sampling time and also in the second half of the period at a second sampling time, and the values obtained are subtracted from one another, thus forming the difference between them. In this way, firstly common-mode interferences are suppressed and secondly the amplitude of the measurement signal MS is doubled compared to the output signal of the operational amplifier V3, so that the sensitivity of the entire circuit arrangement is increased.

Figure 3:
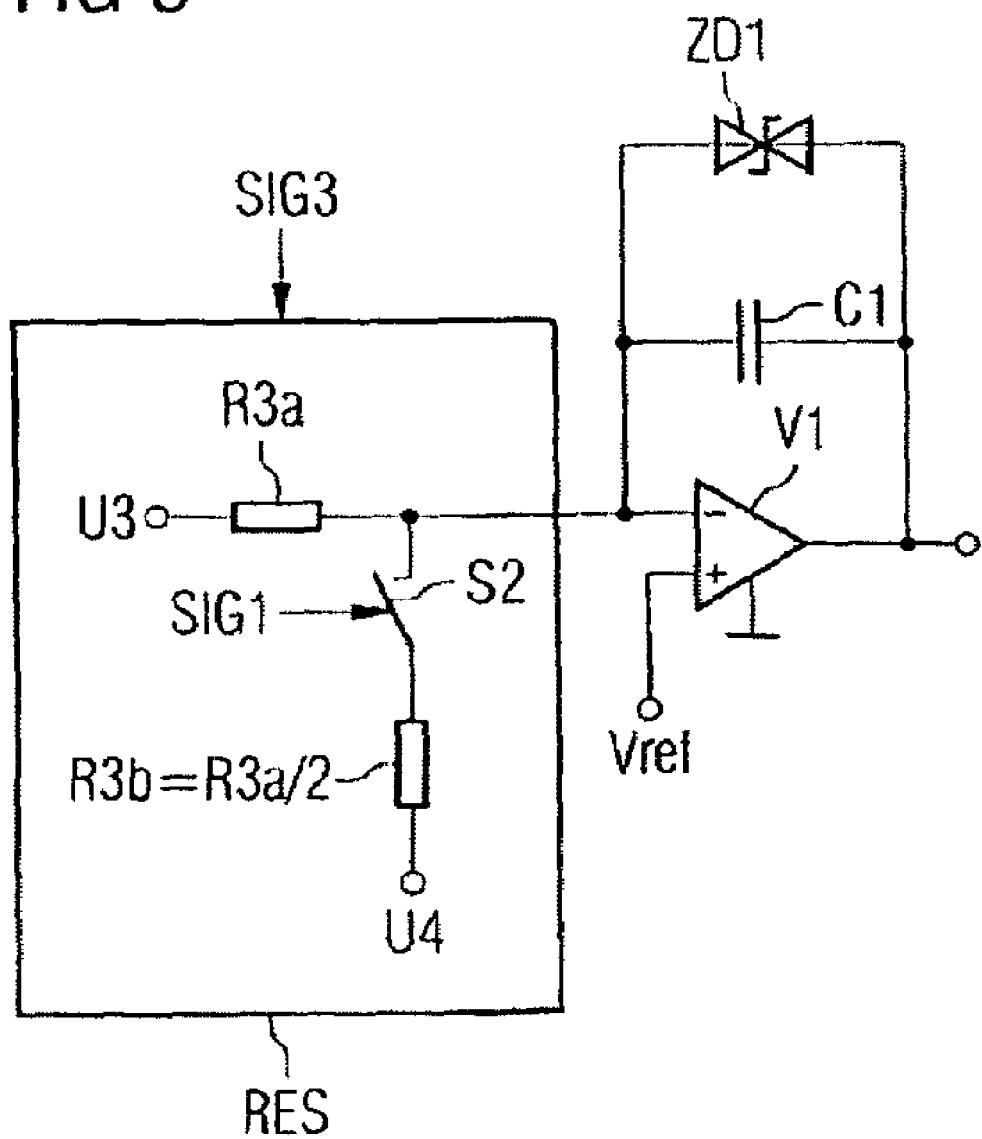
FIG. 3 shows a second embodiment of a rectangular voltage generation circuit.

FIG. 3 shows an advantageous embodiment of the rectangular generation circuit RES'. In the diagram, a first resistor R3a is connected by one of its ports to the inverting input of the operational amplifier V1 of the integration circuit, and by its other port to a third voltage source, which provides a voltage U3. A second resistor R3b is likewise connected by one of its ports via a controllable switch S2 to the inverting input of the operational amplifier V1, and by its other port to a fourth voltage source, which provides a voltage U4. The second resistor R3b has half the value of the resistor R3a and the voltages U3, U4 supplied by the third and fourth voltage sources follow the relationship $$U3-Vref=Vref-U4,$$

which means that the voltages are symmetrical to the reference potential Uref. The switch S2 is triggered by the first control signal SIG1 from the control circuit StS.

As a result of the advantageous embodiment of a rectangular voltage generation circuit RES' according to FIG. 3, a single switch S1 is necessary and, furthermore, the steepness of the edges of the output voltage of the integration circuit or of the output current of the operational amplifier V2 functioning as the voltage current converter can be adjusted by selecting the values of the voltages U3 and U4 of the third of fourth voltage source respectively.

Figure 4:
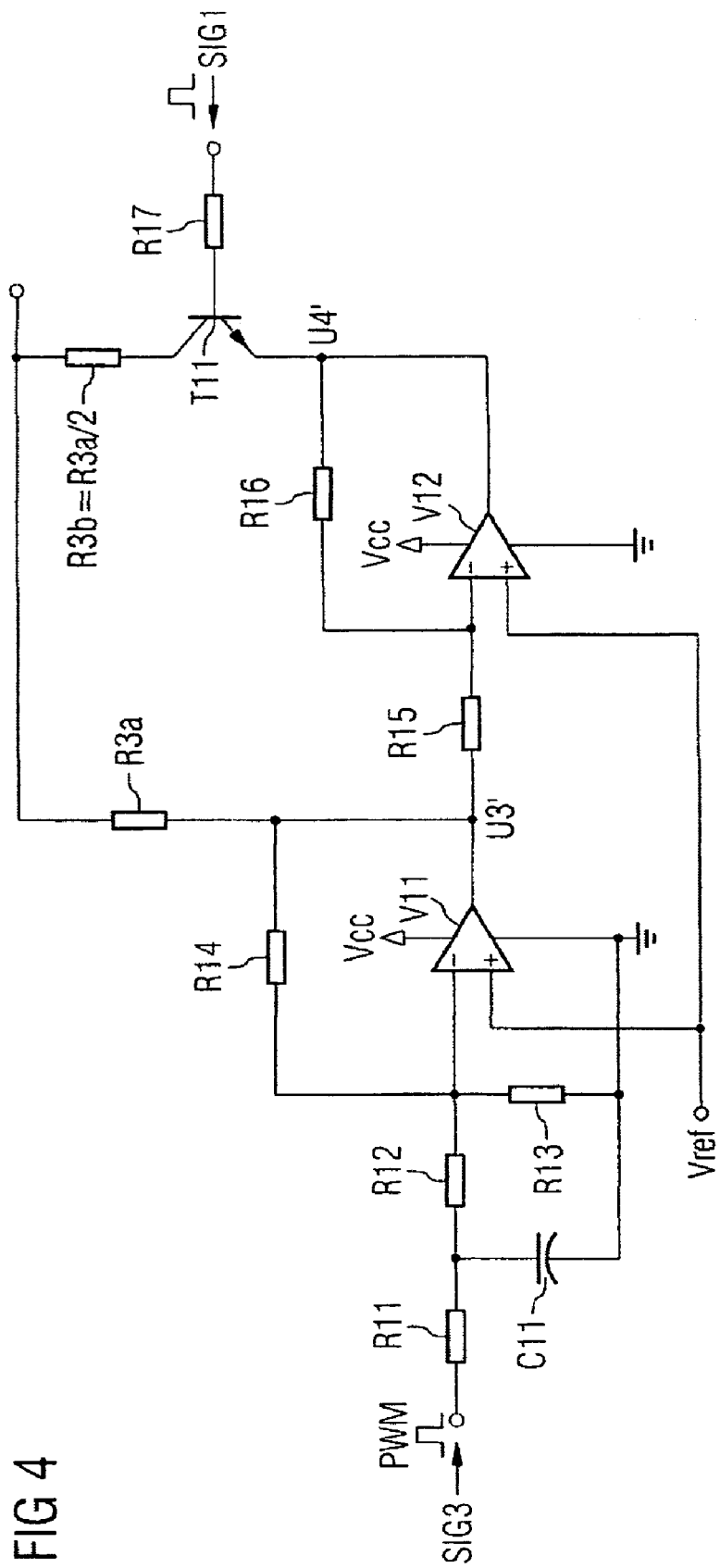
FIG. 4 shows a detailed circuit for the rectangular voltage generation circuit in FIG. 3.

FIG. 4 shows a correspondingly detailed circuit. In the diagram, the third voltage source is formed using an inverting amplifier, which is triggered via a low-pass circuit from resistors R11, R12 and R13 and a capacitor C11 by a pulse-duration-modulated signal SIG3. The pulse-duration-modulated signal SIG3 is delivered by the control circuit (not shown). By varying the pulse duration and the deep-pass filtering the input voltage of the inverting amplifier can be changed, so that a variable voltage U3' is produced at this output. The output of the operation amplifier V11 is coupled back to its inverting input via a resistor R14. Its non-inverting input has the reference potential Vref applied to it.

The fourth voltage source is likewise formed with an inverting amplifier from an operational amplifier V12, whose output is coupled back to its inverting input via a resistor R16 and its non-inverting input is connected to the reference potential Vref. Its inverting input is also connected to the output of the third voltage source via a resistor R15. If the amplification of the inverting amplifier is set to −1 its output voltage U4' with regard to the reference potential Vref is symmetrical to the output voltage U3' of the third voltage source, so that the relationship $$U3' - Vref = Vref - U4'$$

also applies here.

The switch S2 is implemented by a bipolar transistor T11, the base of which is triggered by the first control signal SIG1 via a resistor R17.

For temperature measurement purposes the output 2 of the current voltage converter V2 is now connected via a resistor R30 to the inverting input of an adding operational amplifier V4. The output voltage Uout of the current voltage converter V2 is present on the primary coil Wp which is connected to the current voltage converter output. The output 9 of the integration circuit V1, at which a trapezoidal voltage Uin is present, is likewise connected via a resistor R32 to the inverting input of the adding operational amplifier V4. The voltage Uin is proportional to the current IL through the primary coil Wp. The output of the adding operation amplifier V4 is coupled back via a resistor R31 to the inverting input of the adding operation amplifier V4 and connected to a terminal 10 via a first low-pass circuit R34, C3. The non-inverting input of the adding operational amplifier V4 is connected to the reference potential Vref via a resistor R33. The voltage Uin at the output of the integration circuit V1 is connected via a second low-pass circuit R35, C4 to a terminal 11, at which a voltage Uin' is present.

A voltage Uout' is present at the terminal 10, said voltage being proportional to the sum of the two voltages Uout and Uin and being calculated according to the formula $$Uout' = Uin' \cdot \left[ \frac{RL25(1 + KT(TEMP - 25° \text{ C.})) \cdot R31}{R4 \cdot R30} - \frac{R31}{R32} \right]$$

Thus the formula $$RL = RL25(1 + KT(TEMP - 25° \text{ C.}))$$

reflects the temperature dependence of the resistor RL of the primary coil Wp with regard to a reference temperature of 25° C. The resistance value RL25 is thus the value of the resistance of the primary coil Wp at 25° C. and KT is the temperature constant, which—for copper—has the value $3900 \cdot 10^{-6}$ 1/° C.

The values of the resistors RL25, R30, R31, R32 and R4 may now be advantageously selected such that the voltage Uout' has the value 0 volts at a temperature of 25° C., so that deviations above and below this temperature can be identified by the Uout' voltage sign.

The voltage Uout' at the terminal 10 can be expressed as $$Uout' = SENS_{Soll} \cdot (TEMP - 25° \text{ C.})$$

in which $$SENS_{Soll} = Uin' \cdot KT \cdot \frac{RL25 \cdot R31}{R4 \cdot R30},$$

$SENS_{Soll}$ being the setpoint sensitivity of the circuit arrangement with regard to temperature measurement.

In practice the values of the resistors R30, R31, R32 and R4 deviate from their setpoint values. The value of the resistor RL25 on the primary coil Wp is also subject to manufacturing tolerances and therefore has a value $RL25_{ist}$, which deviates from a setpoint value so that, at the reference temperature of 25° C., the voltage Uout' is not 0 volts but has an offset voltage value Uoffs25. Since the output voltage Uin of the integration circuit V1 is also subjected to fluctuations and deviates from its setpoint value $Uin_{soll}$, the sensitivity SENS also deviates from its setpoint value $SENS_{soll}$ and has a value of $SENS_{ist}$.

If the actual values of the offset voltage Uoffs25, the voltage Uout' at the terminal 10, and the voltage Uin' at the terminal 11 are now measured at the reference temperature of 25° C., the actual value of the resistance $RL25_{ist}$ of the primary coil Wp may now be calculated from them according to the formula $$RL25_{ist} = \left( \frac{Uout'}{Uin'} + \frac{R31}{R32} \right) \cdot R4 \cdot R30$$

Now that this value is known, it is possible to calculate the temperature TEMP according to the formula $$TEMP = \frac{\left( Uin_{soll} \cdot \frac{U_{out'}}{U_{in'}} - U_{offs}25 \right) \frac{RL25}{RL25ist}}{SENS_{soll}} + 25° \text{ C.}$$

This calculation takes place in an arithmetic circuit RS, which is connected to the terminals 10 and 11. The arithmetic circuit RS is also fed the measurement signal MS. From this, and from correction values according to a characteristics field which reflects the temperature dependence of the measurement signal MS, it calculates a corrected measurement signal MS'.

Thus—when the circuit arrangement is put into operation—a calibration measurement is carried out, the corresponding values are stored for Uoffs25 and are calculated and stored for $RL25_{ist}$, and they are used in subsequent calculations of the actual temperature TEMP for correcting the calculations from the measured values of the voltages Uout' and Uin'.

Figure 6:
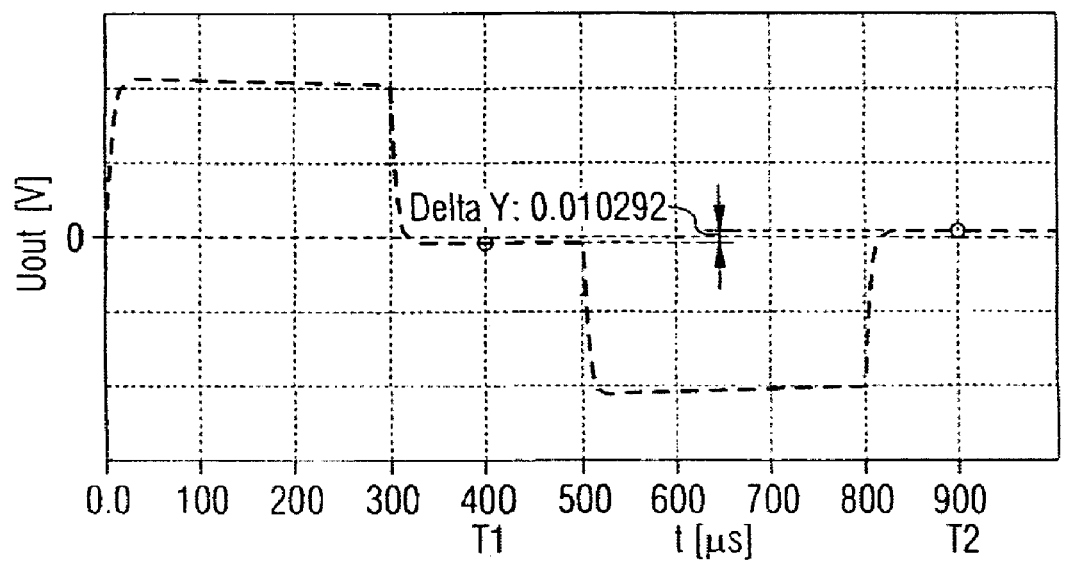
FIG. 6 shows the characteristic of the voltage on the primary coil at a temperature of 25° C.
Figure 7:
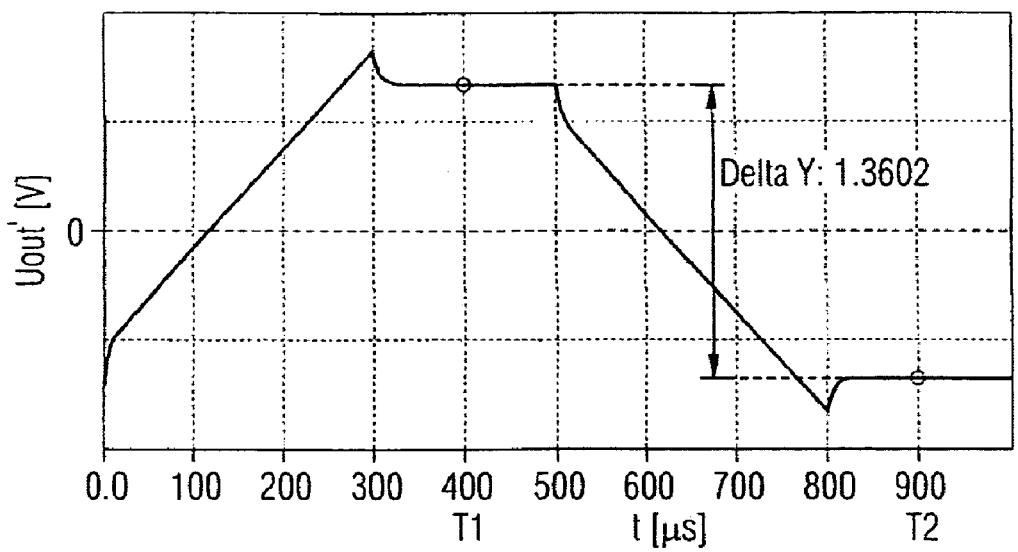
FIG. 7 shows the characteristic of the voltage on the primary coil at a temperature of 85° C.
Figure 8:
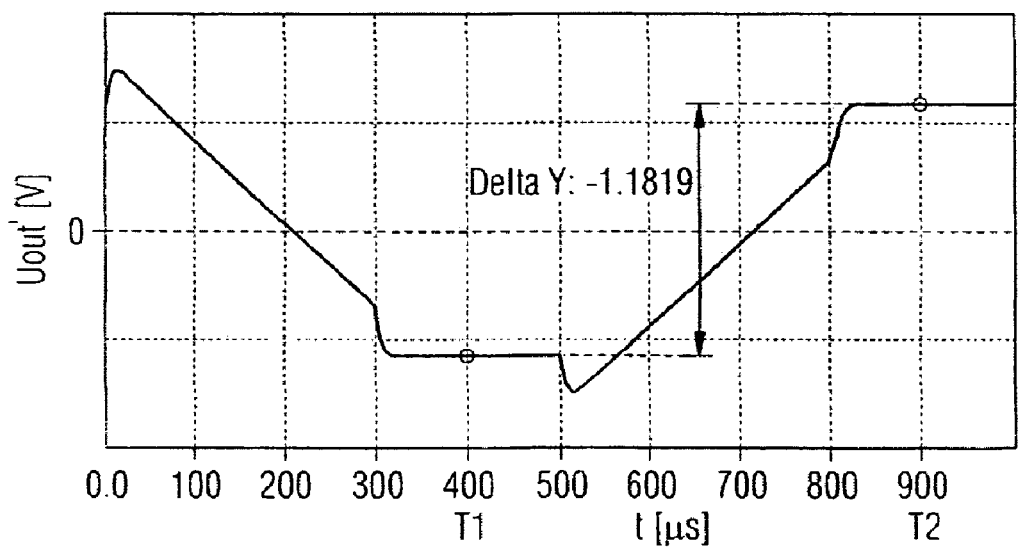
FIG. 8 shows the characteristic of the voltage on the primary coil at a temperature of −40° C.

FIGS. 6 to 8 show characteristics for the voltage Uout for various temperatures.

Figure 9:
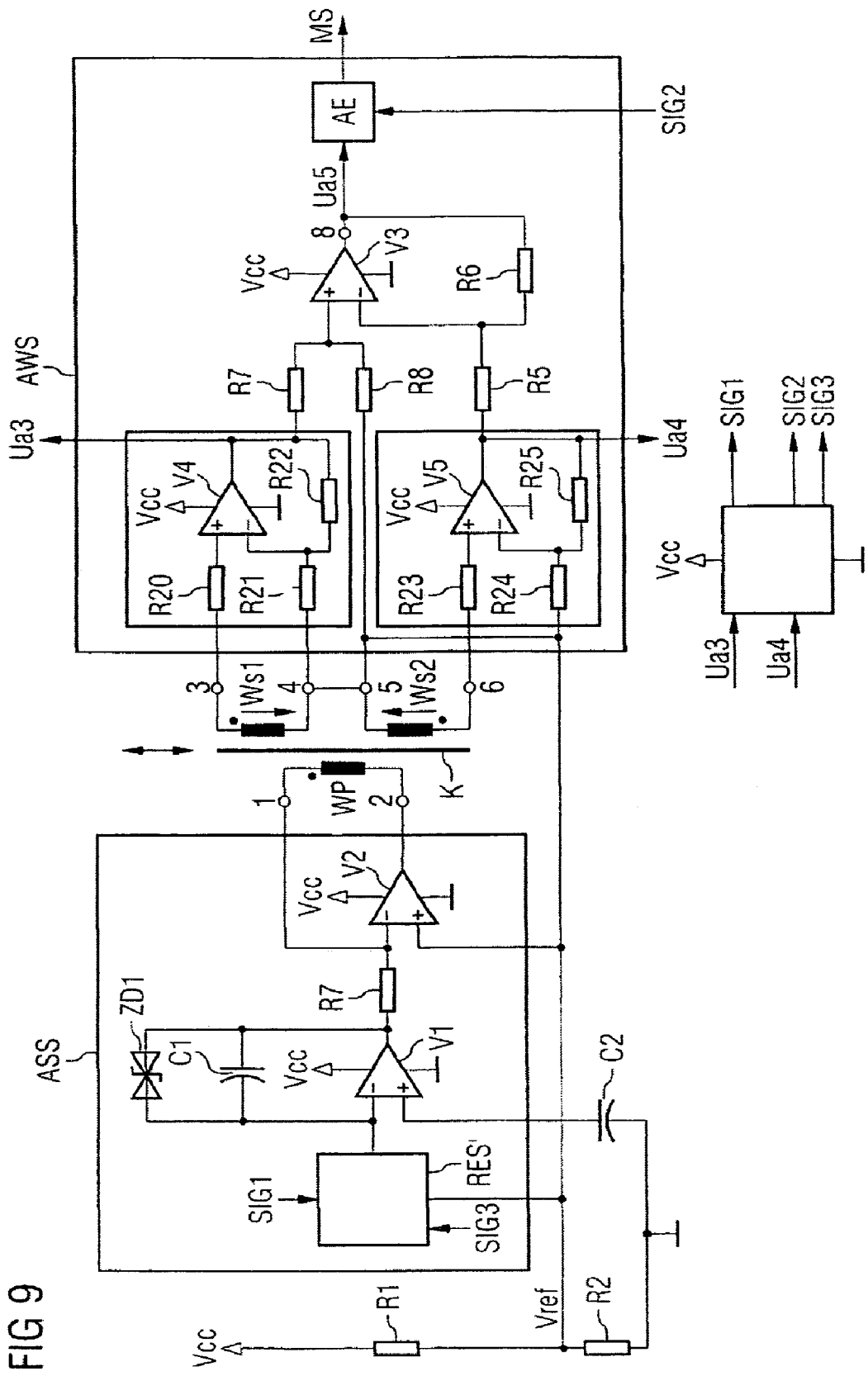
FIG. 9 shows an extended circuit arrangement according to the invention.

FIG. 9 shows a development of the circuit arrangement according to the invention, from which the circuit for temperature measurement has been omitted. The ports 3, 4, 5 and 6 of the secondary coils Sw1 and Sw2 are connected to an analysis circuit AWS. The analysis circuit AWS has a first inverting amplification circuit with an operational amplifier V4, whose output is coupled back via a resistor R22 to its inverting input. The port 3 of the first secondary coil Sw1 is connected via a resistor R20 to the non-inverting input and the port 4 of the first secondary coil Sw1 is connected via a resistor R21 to the inverting input of the operational amplifier V4.

The analysis circuit AWS also has a second inverting amplifier circuit with an operational amplifier V5, whose output is coupled back to its inverting input via a resistor R25. The port 5 of the second secondary coil Sw2 is connected via a resistor R24 to the non-inverting input and the port 6 of the second secondary port Sw2 is connected via a resistor R23 to the inverting input of the operational amplifier V5.

A first output voltage Ua3 can be picked up at the output of the first amplifier circuit and a second output voltage Ua4 can be picked up at the output of the second amplifier circuit. The two output voltages Ua3, Ua4 are fed to the control circuit StS, which—dependent on these two output voltages Ua3, Ua4—in turn provides a control signal SIG for triggering the rectangular generation circuit RES'. The characteristics of the two output voltages Ua3 and Ua4 are shown in Diagram 3 of FIG. 2 for a case in which the core K of the transformer is displaced from its midway position.

The analysis circuit AWS has a third inverting amplifier circuit which is formed using an operational amplifier V3 whose output is coupled back via a resistor R6 to its inverting input. The output of the first amplifier circuit V4, R20, R21, R22 is connected via a resistor R7 to the non-inverting input of the operational amplifier V3, and the output of the second amplifier circuit V5, R23, R24, R25 is connected via a resistor R5 to the inverting input of the operational amplifier V3. The non-inverting input of the operational amplifier V3 is further connected to the reference potential Vref via a resistor R8. Furthermore, the two ports 4 and 5 of the two secondary coils Sw1, Sw2 are connected to the reference potential Vref.

Operational amplifiers of the circuit arrangement according to FIG. 9 are operated on the supply potentials Vcc and ground.

Furthermore, the analysis circuit AWS is formed using an analysis unit AE, which is triggered by a control signal SIG2 delivered by the control circuit StS. The input of the analysis unit AE is connected to the output port 8 of the operational amplifier V3. A measurement signal MS is provided at its output. The analysis unit AE is configured such that, timed by the second control signal SIG2 generated by the control circuit, in an advantageous method it samples the output voltage Ua5 of the operational amplifier V3 both in the first half of the period at a sampling time At1 and also in the second half of the period at a sampling time At2, and the values obtained are subtracted from one another, thus forming the difference between them. In this way, firstly common-mode interferences are suppressed and secondly the amplitude of the measurement signal MS is doubled compared to the output signal Ua5 of the operational amplifier V3, so that the sensitivity of the entire circuit arrangement is increased.

As well as the characteristics of the output voltage of the rectangular generation circuit RES' and of the current through the primary coil Wp, FIG. 10 shows the characteristics of the output voltages Ua3 and Ua4 of the amplifier circuits V4, V5 of the analysis circuit AWS, for the case in which the core of the transformer is displaced from its midway position. As can be seen, the voltage Ua4 has a somewhat higher amplitude than the voltage Ua3, the sum of the two voltages being maintained at a constant value by means of the control circuit StS.

What is claimed is:

1. A circuit arrangement, comprising:
    a linear variable differential transformer as a displacement sensor;
    a selection circuit which is connected to a primary coil of the transformer and which provides an output current for triggering the primary coil;
    an analysis circuit which is connected to secondary coils of the transformer and which provides a measurement signal; and
    a control circuit to trigger the selection circuit and the analysis circuit and to process the measurement signal provided by the analysis circuit is connected to the primary coil to calculate a temperature of the circuit arrangement, and is configured such that it determines the temperature-dependent ohmic resistance of the primary coil and calculates the temperature and corrects accordingly the measurement signal provided by the analysis circuit, the current having a trapezoidal characteristic through the primary coil with equally high rising edge and falling edge values, and the control circuit configured such that sampling values of a rectangular voltage picked up on the primary coil and of a voltage proportional to the current through the primary coil are taken at times at which the trapezoidal current has a constant characteristic.

2. The circuit arrangement according to claim 1, wherein the control circuit has an adding circuit with inputs connected to terminals at which a voltage proportional to the resistance value of the primary coil or a reference voltage are provided.

3. The circuit arrangement according to claim 2, wherein the reference voltage is a voltage proportional to the current through the primary coil.

4. The circuit arrangement according to claim 1, wherein sampling values are taken in a first and the second half of a period of the rectangular voltage picked up at the primary coil, and of the voltage proportional to the current through the primary coil, and in that difference values formed from the sampling values from the first half of the period and from the sampling values from the second half of the period are used as measurement values.

5. The circuit arrangement according to claim 1, wherein output ports of the secondary coils are connected to a control circuit, which is configured such that a sum of output voltages present at the output ports is compared to a setpoint value, and the control circuit interoperates with the selection circuit such that rising edge and falling edge values of a triangular output current of the selection circuit are varied in a manner inversely proportional to deviation of sum of the output voltages from the setpoint value.

6. The circuit arrangement according to claim 5, wherein the analysis circuit has two amplifier circuits, which are connected to one of the two secondary coils and amplify respective output signals, and the outputs of the amplifier circuits are connected to the control circuit.

7. The circuit arrangement according to claim 6, wherein the selection circuit has a rectangular voltage generation circuit and an integration circuit triggered by the rectangular voltage generation circuit.

8. The circuit arrangement according to claim 7, wherein the rectangular voltage generation circuit is formed with a first resistor, having a first port connected to a third voltage source and a second port connected to the output of the rectangular voltage generation circuit, and with a second resistor, having a first port connected to a fourth voltage source and a second port connected via a switch controllable from the control circuit to the output of the rectangular voltage generation circuit, the voltages of the third and the fourth voltage source following a relationship $$U3-Uref=Uref-U4$$

and Uref being a reference voltage.

9. The circuit arrangement according to claim 8, wherein the third and the fourth voltage source are configured such that they are controllable and their voltages can be adjusted via the control circuit.

10. The circuit arrangement according to claim 9, wherein the integration circuit is formed with an operational amplifier having an output coupled back to the inverting input via a capacitor, with a bi-directional Zener diode being switched in parallel to the capacitor.

11. The circuit arrangement according to claim 10, wherein the analysis circuit is configured such that sampling values of the rectangular difference between the output voltages of the secondary coils picked up on the coils are taken in the first and second halves of the period, and the difference values formed from the sampling values from the first half of the period and from the sampling values from the second half of the period are output as the measurement signal.

* * * * *